Patented May 3, 1938

2,115,874

UNITED STATES PATENT OFFICE 2,115,874

HYDRATION OF ETHERS

Charles W. Rehm, Charleston, W. Va., assignor, by mesne assignments, to Union Carbide and Carbon Corporation, a corporation of New York No Drawing. Application November 9, 1935,
Serial No. 49,036

13 Claims. (Cl. 260—156)

The present invention relates to the hydration of ethers; and more especially it concerns the production of aliphatic alcohols by the catalytic, vapor-phase hydration of the corresponding aliphatic ether; and the production of a catalyst for use therein. The hydration may be conducted at atmospheric pressure or thereabouts, although both lower and higher pressures also may be employed.

Processes are already known for the vapor-phase hydration of ethers, employing solid hydration catalysts such as alumina of high purity. S. P. Burke describes such a process in his U. S. Patent No. 1,602,846. However, his process was inoperative for the treatment of ethyl ether and the higher ethers. Heretofore it was generally regarded essential to use highly purified catalysts, prepared by precipitating alumina from a pure aluminum salt such as the nitrate, followed by washing of the alumina to remove excess reagents. These catalysts were inactive at temperatures below 225° C.; and at temperatures around 300° C. and above, they served to initiate dehydration reactions producing olefines.

The present invention is based upon the discovery that a catalyst of high activity for the hydration of aliphatic ethers can be prepared conveniently and economically by impregnating alumina with aluminum sulfate, preferably in the form of an aqueous solution. The operating temperatures required for optimum alcohol production are much lower than those required when using untreated alumina; and fouling of the catalyst is effectively limited.

Among the more important objects of the invention are: to provide for the use in ether hydration of a novel, relatively inexpensive catalyst; and to provide in novel manner for the catalytic hydration of ethers at relatively low temperatures.

According to the invention, the aliphatic ether to be hydrated is mixed with water vapor, and the mixture of reactants is passed over a catalytic mass in a reaction zone at elevated temperatures, and preferably at around atmospheric pressure. The optimum temperatures will depend upon such factors as the particular ether being hydrated, the ether space velocity used, and the ether/steam ratio used.

The reaction mixture, containing some alcohol formed by the hydration of the corresponding ether, is rapidly cooled as it leaves the reaction zone; and the liquid condensate is fractionally distilled to separate the alcohol from the unchanged portions of the water and ether. Any unconverted ether present in the tail gases may be recovered for reuse in the process, if desired.

The catalyst may be prepared by digesting alumina, which may be any of those form sufficiently highly dispersed as to show catalytic activity, including the commercial form known as "activated alumina", in a solution of aluminum sulfate or of certain other metal sulfates. The commercial grade of aluminum sulfate is well adapted for use as the treating agent. The strength of the solution may vary, depending in part upon the temperature of the digestive mixture. Desirably the digestion is conducted at a temperature approaching 100° C., and generally at around 90° C., for from 24 to 36 hours.

The amount of aluminum sulfate

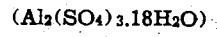

employed preferably is equal to from 20 to 50% of the weight of the alumina being treated. The amount of water used should be at least sufficient to cover the mass of alumina. When 20% or less of the sulfate is employed, it is practically all taken up by the alumina, forming an insoluble basic sulfate intimately mixed with the alumina. When as much as 50% of the hydrated sulfate is used, some remains in the solution, and only about 33% combines with the alumina.

The supernatant liquid may then be drained from the catalyst; or it may be evaporated. It is essentially water containing traces of sodium sulfate along with more or less aluminum sulfate, especially when an excess of aluminum sulfate has been used. The catalyst is then dried at a low temperature, or may be introduced wet into the catalyst tube.

The following will serve to illustrate the practice of the invention according to a preferred modification, for the hydration of ethyl ether to produce ethanol. A mixture of the said ether and water vapor, containing preferably around five to six mols of water per mol. of ether, was passed at approximately atmospheric pressure over an impregnated alumina maintained at elevated temperatures in a reaction zone. The catalyst was prepared by digesting activated alumina with an aqueous solution of commercial aluminum sulfate, after which the supernatant liquid was drained off, and the catalyst was dried at about 100° C. Under such conditions, at an inlet space velocity of 48 volumes of the mixed vapors per volume of catalyst per hour, and when maintaining the reaction zone at 225° C., a 30% overall yield of ethanol and less than 3% overall yield of ethylene have been obtained from ethyl ether, with a production ratio of ethanol of 60 grams per hour per liter of catalyst.

Higher reaction temperatures with higher space velocities or lower temperatures with lower velocities may be used, so adjusted to each other as to give about 30% yields of ethanol. If the temperature and velocity are so balanced as to give greater yields than this, a higher proportion of ethylene will be formed.

Alumina impregnated with 20% of its weight of hydrated aluminum sulfate showed the following analysis:

| | Percent |
|---|---|
| $Al_2O_3$ | 78.32 |
| FeO | 0.04 |
| $SO_3$ | 5.00 |
| $Na_2O + K_2O$ | .18 |
| Ignition loss | 16.40 |

Untreated commercial alumina:

| | |
|---|---|
| $Al_2O_3$ | 91.23 |
| FeO | 0.04 |
| $Na_2O + K_2O$ | 1.27 |
| Ignition loss | 7.10 |

Certain other sulfates, such as the sulfates of copper, cerium, chromium, iron and zinc, may be substituted for the aluminum sulfate in impregnating and/or leaching the alumina. Those named above,—which are somewhat less effective than aluminum sulfate in activating alumina for use in hydrating olefines and ethers,—are named in the order of decreasing activity of the impregnated catalyst. Catalysts prepared by digesting alumina with one of these last-named sulfates show activities at 230°–250° C. about equal to that of the aluminum sulfate digested catalyst at 220° C. Alumina that has been digested with a sulfate of manganese, or nickel or magnesium, is less active for ether hydration than those previously mentioned.

Generally it is unnecessary that a leaching action occur when treating the alumina with the selected sulfate. Under certain conditions where there may be present large amounts of sodium sulfate,—as, for example, where the alumina used contains large amounts of sodium aluminate,—the sodium sulfate formed preferably is leached from the treated alumina. Small amounts thereof do not appear to be detrimental.

The process likewise is adapted for use in the hydration of the higher ethers, such as normal propyl, isopropyl, normal butyl, and isobutyl ethers. Preferably, when hydrating such higher ethers, temperatures not exceeding 225° C. are employed, in association with the same or higher space velocities than those employed in the hydration of ethyl ether.

Methyl ether may be hydrated at higher temperatures, around 275° to 300° C., and preferably at around atmospheric pressure.

The invention is susceptible of modification within the scope of the appended claims.

I claim:

1. The process for hydrating an aliphatic ether, which comprises reacting in the vapor phase an aliphatic ether and water vapor in the presence of a catalyst consisting of alumina activated by treatment with aluminum sulfate.

2. The process for hydrating an aliphatic ether, which comprises reacting in the vapor phase an aliphatic ether and water vapor in the presence of a catalyst consisting of commercial alumina activated by treatment with aluminum sulfate.

3. The process of hydrating an aliphatic ether, which comprises passing a vaporous mixture of the said ether and a large excess of water vapor over a solid catalyst consisting of commercial alumina digested with a water-soluble sulfate selected from the group consisting of the sulfates of aluminum, copper, cerium, chromium, iron, and zinc.

4. The process of hydrating an aliphatic ether, which comprises passing a vaporous mixture of the said ether and a large excess of water vapor over a solid catalyst consisting of alumina digested and impregnated with commercial aluminum sulfate.

5. The process of hydrating an aliphatic ether, which comprises passing a vapor phase mixture of an aliphatic ether and water vapor over a solid catalyst consisting of alumina digested with aluminum sulfate solution and from which the excess solution and materials soluble therein have been removed.

6. The process of preparing a hydration catalyst, which comprises digesting alumina with a solution of aluminum sulfate, the amount of said sulfate being less than the amount of said alumina, separating from the alumina the excess of the said solution, and recovering the resultant product containing alumina and aluminum sulfate and in which the alumina predominates.

7. The process of preparing a hydration catalyst, which comprises digesting commercial alumina with a solution of aluminum sulfate, the amount of said sulfate being less than the amount of said alumina, separating from the alumina the excess of the said solution containing components removed from the alumina by the latter, and recovering the resultant product containing alumina and aluminum sulfate and in which the alumina predominates.

8. The process of preparing a hydration catalyst, which comprises digesting commercial alumina with a solution of aluminum sulfate, the amount of said sulfate being less than the amount of said alumina, separating from the alumina the excess of the said solution containing components removed from the alumina by the latter, and recovering and drying the resultant product containing alumina and aluminum sulfate and in which the alumina predominates.

9. The process of producing an aliphatic alcohol, which comprises reacting an aliphatic ether and steam in the vapor phase at an elevated temperature not substantially above around 300° C., in the presence of alumina activated by treatment with a compound selected from the group consisting of the sulfates of aluminum, copper, cerium, chromium, iron and zinc.

10. The process of producing an aliphatic alcohol which comprises reacting a dialkyl ether having more than three carbon atoms in the molecule, with steam in the vapor phase, at an elevated temperature not exceeding around 225° C., in the presence of alumina activated by treatment with a compound selected from the group consisting of the sulfates of aluminum, copper, cerium, chromium, iron and zinc.

11. The process of producing ethanol, which comprises reacting diethyl ether and steam in the vapor phase at an elevated temperature around 220° C., in the presence of alumina activated by treatment with a compound selected from the group consisting of the sulfates of aluminum, copper, cerium, chromium, iron and zinc.

12. The process of producing methanol, which comprises reacting dimethyl ether and steam in the vapor phase at an elevated temperature not substantially higher than around 300° C., in the presence of alumina activated by treatment with a compound selected from the group consisting of the sulfates of aluminum, copper, cerium, chromium, iron and zinc.

13. The process of preparing a hydration catalyst, which comprises digesting alumina with a solution of a compound selected from the group consisting of the sulfates of aluminum, copper, cerium, chromium, iron and zinc, the amount of said sulfate being less than the amount of said alumina, separating from the alumina the excess of the said solution, and recovering the resultant product containing alumina and the said sulfate and in which the alumina predominates.

CHARLES W. REHM.